P. MEDART,

Assignor, by mesne assignments, of part interest to W. MEDART.

Belt Pulley.

No. 9,671. Reissued April 19, 1881.

ATTEST:

Robert Burns.

Wm. Medart

INVENTOR:

Philip Medart

N. PETERS, PHOTO-LITHOGRAPHER, WASHINGTON, D. C.

UNITED STATES PATENT OFFICE.

PHILIP MEDART, OF ST. LOUIS, MISSOURI, ASSIGNOR, BY MESNE ASSIGNMENTS, OF PART INTEREST TO WILLIAM MEDART, OF SAME PLACE.

BELT-PULLEY.

SPECIFICATION forming part of Reissued Letters Patent No. 9,671, dated April 19, 1881.

Original No. 199,848, dated January 29, 1878; Reissue No. 8,909, dated September 30, 1879. Application for reissue filed March 23, 1881.

*To all whom it may concern:*

Be it known that I, PHILIP MEDART, a citizen of the United States, residing at St. Louis, in the State of Missouri, have invented certain new and useful Improvements in Belt-Pulleys; and I do hereby declare that the following is a full, clear, and exact description of the invention, reference being had to the accompanying drawings, making part of this specification.

The object of this invention is to overcome several objections that exist to the present mode of forming belt-pulleys of a single piece of cast metal. It is difficult to cast such pulleys so that the rim will be even in thickness and balanced perfectly. Further, in cooling, the rim of the pulley chills in advance of the center or hub, which causes the parts to be strained and weakened, and the rim itself, from the nature of its material, is liable to yield to a centrifugal strain; and this invention consists, first, in forming the pulley with a rimless spider of any suitable construction, the arms of which have at their outer ends bracket-lugs arranged on a plane parallel with the axis, and a wrought-metal rim, which, after being bent into the required shape, is securely fastened to the spider by means of rivets passing through the rim and said bracket-lugs; second, in forming the rim for belt-pulleys of wrought metal bent into the proper shape, and secured by rivets to a spider consisting of a hub and arms which are cast in a single piece; third, in forming the joint of the rim upon one of the bracket-lugs, and securing the ends thereto by means of two sets of rivets.

Figure 1:
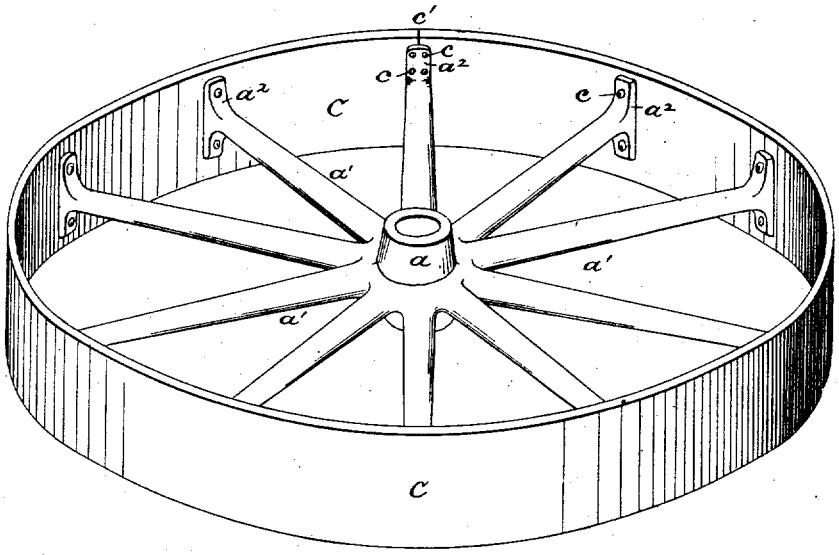
Figure 2:
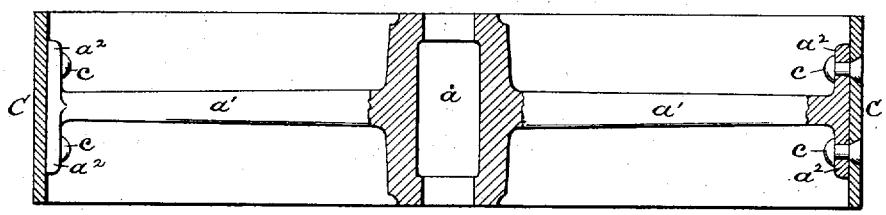

In the drawings, Figure 1 is a perspective view, and Fig. 2 is a cross-section, of my improved pulley.

In the drawings I have shown the hub $a$ and arms $a'$ made in a single piece of cast metal, with bracket-lugs $a^2$ at the outer ends of the arms arranged in a plane parallel with the axis.

The rim C is formed of rolled wrought metal, which is bent to proper shape and secured to the bracket-lugs $a^2$ of the spider by means of rivets $c$, the joint $c'$ of the rim being placed over one of the bracket-lugs and the ends secured by two rows of rivets, $c$, as shown in Fig. 1. The rim is shown as formed of a flat bar or sheet of wrought metal, as this form allows of the rim being readily and accurately bent or rolled into a true circle in any ordinary bending-machine, and thereby render the production of the pulleys cheap and easy.

By my improved construction all the parts of the pulley can be readily and accurately made and fitted together. The rim can be attached to the spider not only without straining it, but, from the character of its material, be made to greatly strengthen it. The pulley can be made much lighter, weighing but one-third of what it would if made of cast-iron throughout, and with much less expense. Not only the rim is materially lightened, but the arms also. The method also allows the arms to be readily cast straight—a shape not easily obtained when the arms and rim are in one casting. And, again, by the position of the bracket-lugs $a^2$, as described, the edges of the rim are supported and braced in a very effective manner, thus avoiding all danger of the working loose of the rivets, &c., in the practical use of the pulley.

The spiders can be made in quantities and kept in stock, and any desired width of rim attached thereto, for the center of a belt-pulley is made in regular sizes, while the face of the pulley is liable to vary in each case. In some cases the face is of such width as to require a double set of arms and an elongated hub. Such a construction can be readily provided by my method by using two or more of the centers or spiders placed side by side, and having a single rim of the desired width fastened to them.

Having thus fully described my invention, what I claim as new, and desire to secure by Letters Patent, is—

1. A belt-pulley composed of a rimless spider having at the outer ends of its arms bracket-lugs $a^2$, arranged substantially as described, and a wrought-metal rim, for the purpose set forth.

2. The combination, in a belt-pulley wheel, of a hub and arms made in one piece of cast metal, and a rim of wrought metal, as and for the purpose set forth.

3. A belt-pulley having the joint $c'$ of its rim placed over one of the bracket-lugs $a^2$ of the spider, as and for the purpose set forth.

Witnesses: PHILIP MEDART.

WM. MEDART,

ROBT. BURNS.